G. A. FOWLER, Jr.
FLUID PRESSURE STABILIZER FOR AEROPLANES.
APPLICATION FILED NOV. 23, 1917.
1,278,627.
Patented Sept. 10, 1918.
5 SHEETS—SHEET 4.
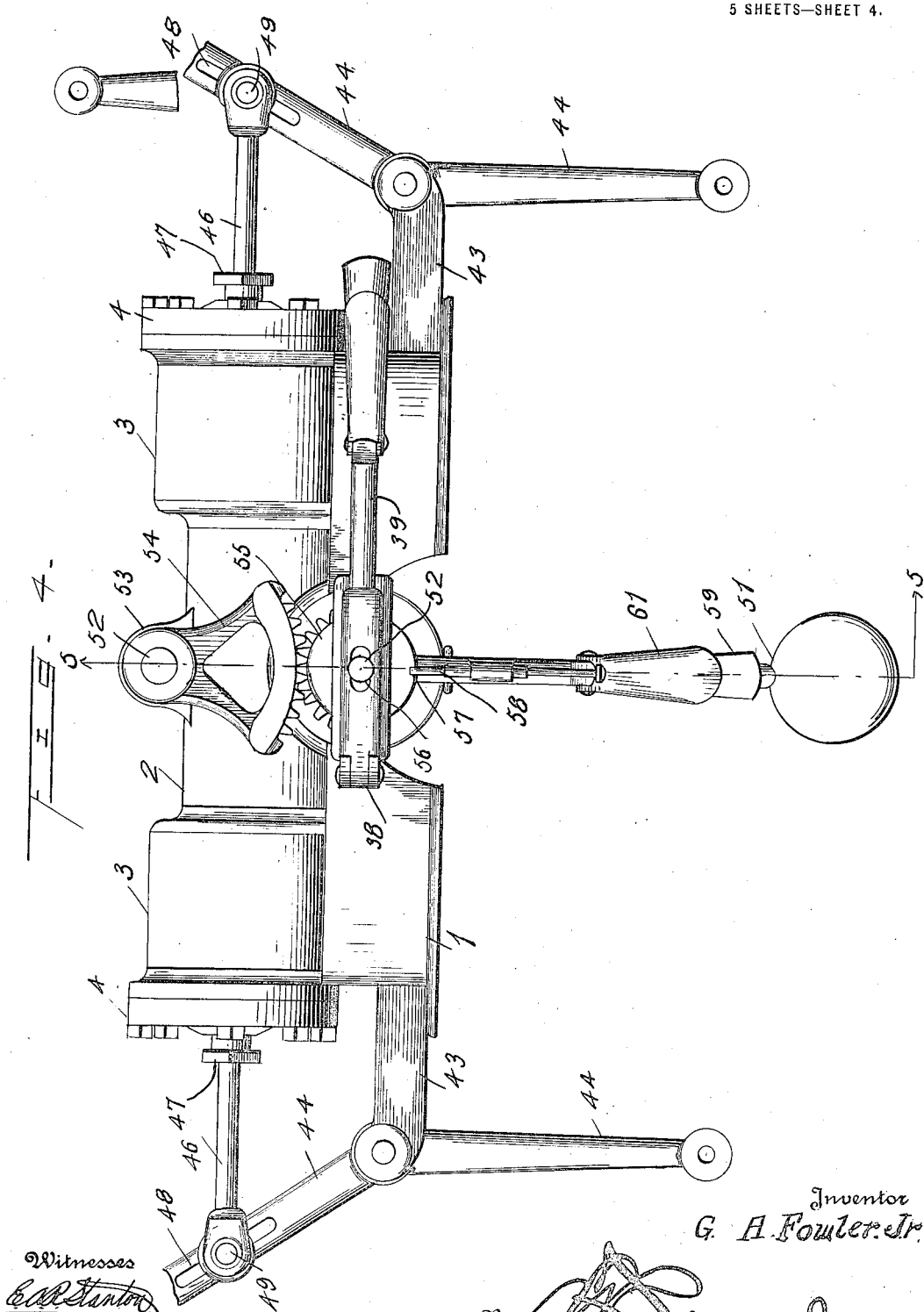

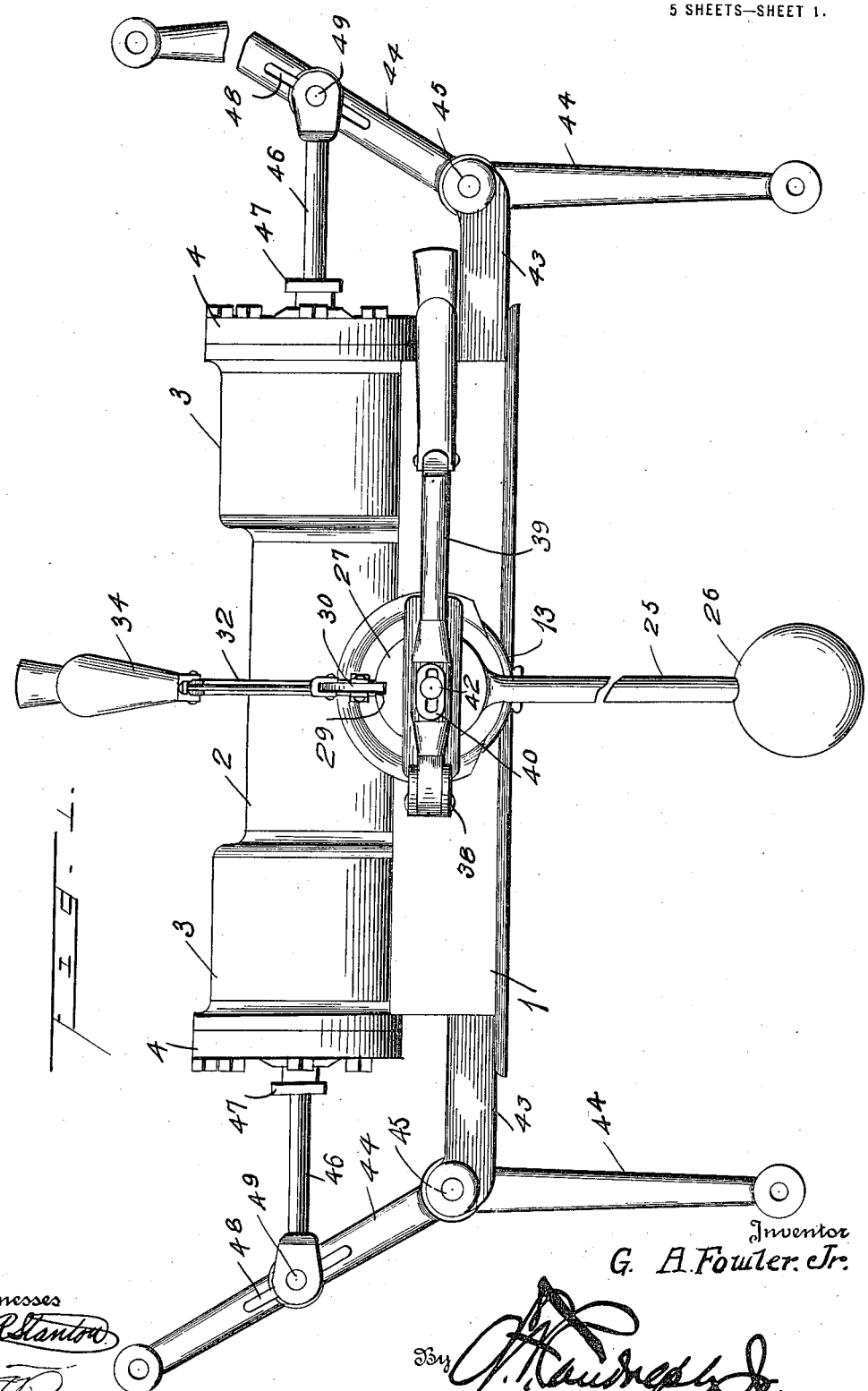

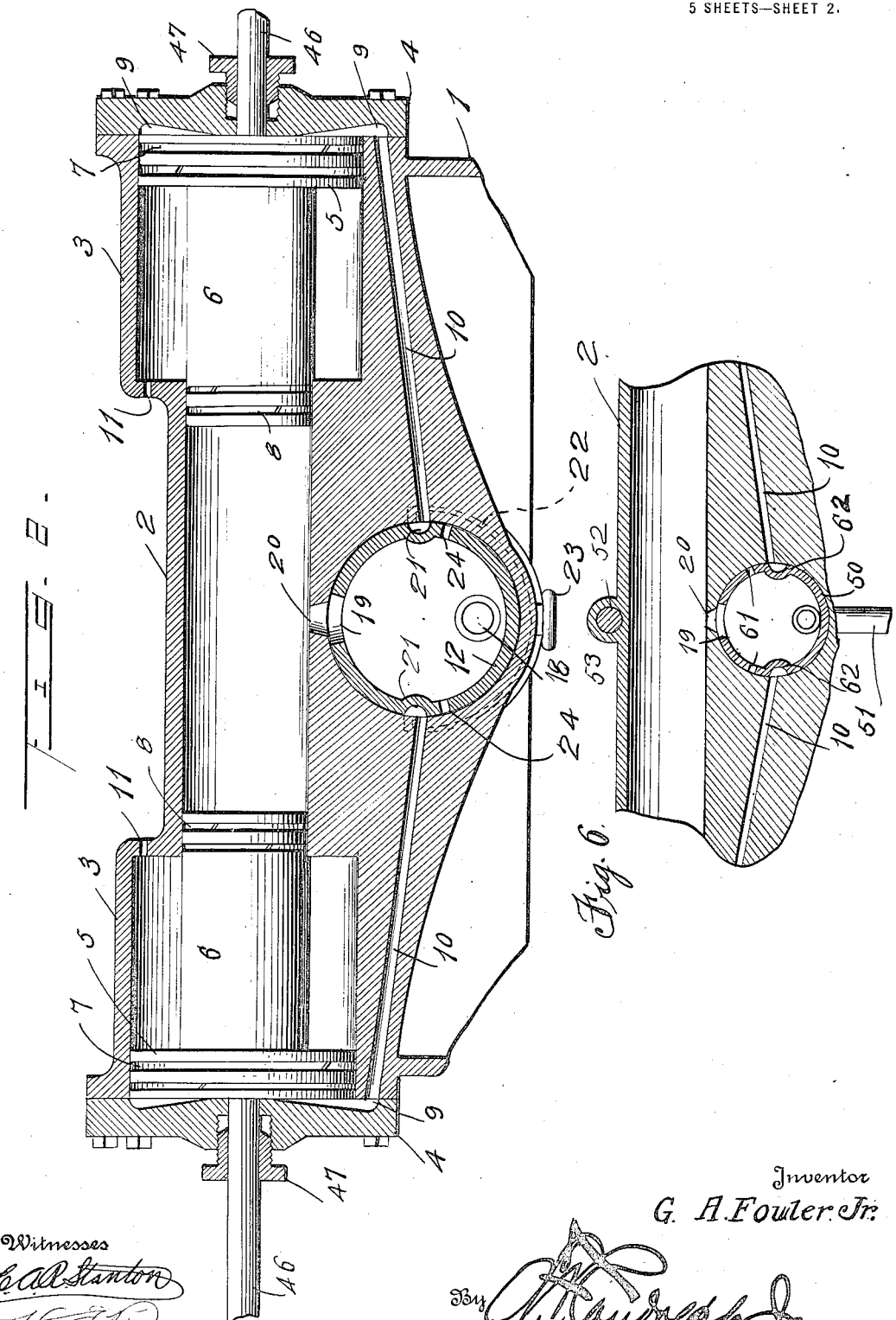

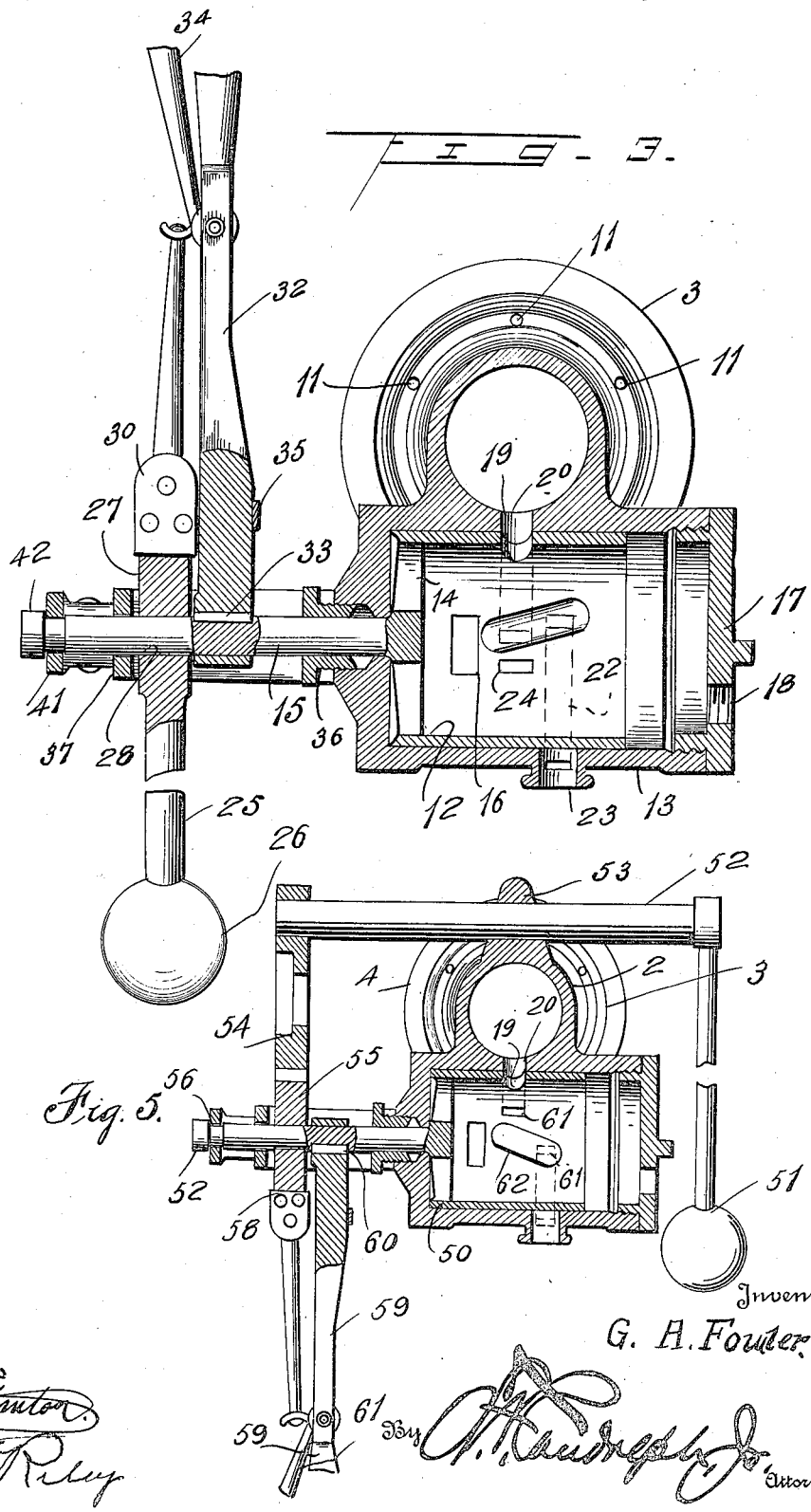

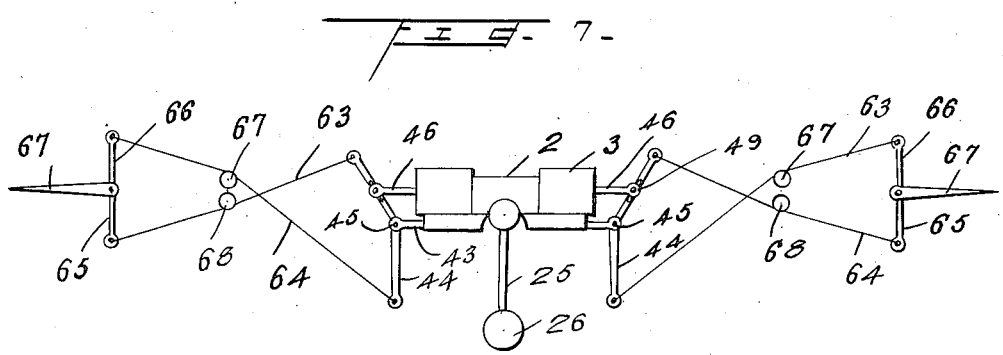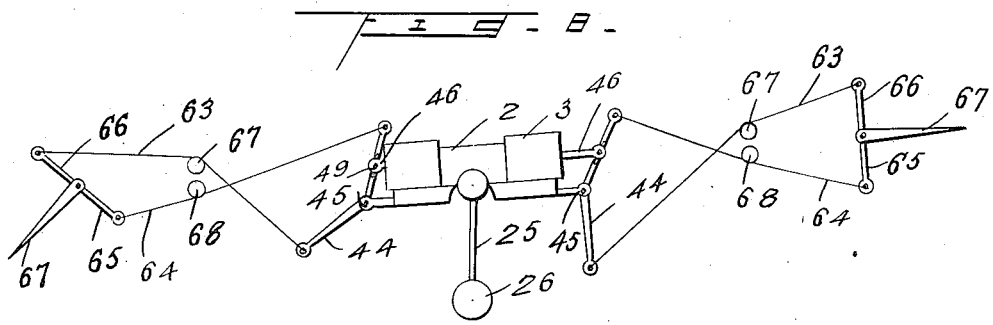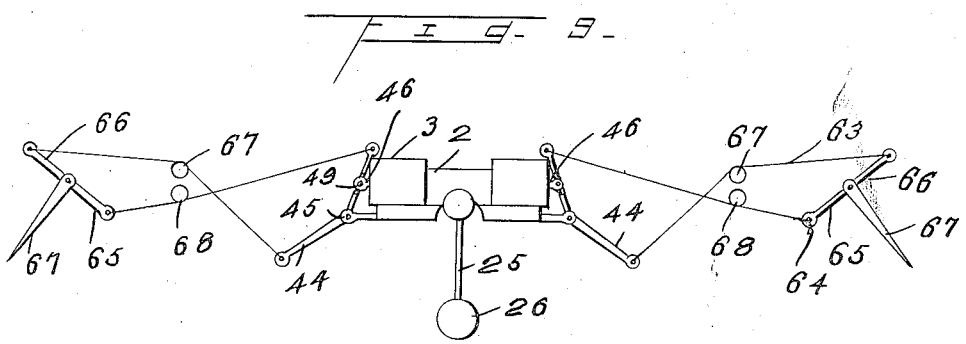

UNITED STATES PATENT OFFICE.

GEORGE A. FOWLER, JR., OF THATCHER, ARIZONA.

FLUID-PRESSURE STABILIZER FOR AEROPLANES.

1,278,627.

Specification of Letters Patent.  Patented Sept. 10, 1918.

Application filed November 23, 1917. Serial No. 203,649.

*To all whom it may concern:*

Be it known that I, GEORGE A. FOWLER, Jr., a citizen of the United States, residing at Thatcher, in the county of Graham and State of Arizona, have invented certain new and useful Improvements in Fluid-Pressure Stabilizers for Aeroplanes; and I do hereby declare the following to be a full, clear, and exact description of the invention, such as will enable others skilled in the art to which it appertains to make and use the same.

The invention relates to a fluid pressure stabilizer for aeroplanes.

The object of the present invention is to improve the construction of stabilizers for aeroplanes and to provide a simple, practical and efficient fluid pressure stabilizer of strong, durable and comparatively inexpensive construction capable of operation through the lateral tilting of an aeroplane and of actuating hinged ailerons or auxiliary planes for restoring the equilibrium of the aeroplane. A further object of the invention is to provide a stabilizer of this character capable of operating independently the ailerons on opposite sides of an aeroplane and of permitting a simultaneous operation of the same manually for retarding the speed of an aeroplane for enabling the same to make a landing gently without jar.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is an elevation of a fluid pressure stabilizer constructed in accordance with this invention.

Fig. 2 is a longitudinal sectional view through the cylinders and the rotary valves.

Fig. 3 is a central vertical sectional view of the same.

Fig. 4 is an elevation illustrating another form of the invention in which mechanism is provided for an indirect operation of the rotary valve for increasing the movement of the same.

Fig. 5 is a plan view of the form of the invention shown in Fig. 4.

Fig. 6 is a vertical sectional view of the same through the center of the rotary valve.

Figs. 7 to 9 inclusive are diagrammatic views illustrating the operation of the stabilizer.

Like numerals of reference designate corresponding parts in the several figures of the drawings.

Referring particularly to Figs. 1 to 3 inclusive of the drawings, the fluid pressure stabilizer, which may be operated by steam, water, compressed air or the like, from any suitable source, comprises in its construction a base 1 having preferably cast integral therewith intermediate and end cylinders 2 and 3, the end cylinders 3 being of greater diameter than the intermediate cylinder 2 which connects the end cylinders. The end cylinders 3, which are provided with heads 4, receive pistons 5 to which are connected inner pistons 6 preferably cast integral with the end or outer pistons 5 and being of a diameter substantially that of the diameter of the intermediate cylinder 2 and movable into and out of the same. The cylinders 5 and 6 are provided with packing rings 7 and 8 of any desired construction and the cylinder heads 4 are recessed at 9 to permit fluid pressure from passages 10 to act against the outer faces of the outer or end pistons when fluid pressure is admitted to the said passages 10. The inner end walls of the end cylinders are provided with vent ouenings 11 communicating with the atmosphere and adapted to permit a slow escape of the air from the end cylinders when the pistons are moved inwardly from the position illustrated in Fig. 2 of the drawings. The pistons are normally at the limit of their outward movement as shown in Fig. 2, and when in this position the end recesses or spaces 9 communicate with the atmosphere by the means hereinafter described. When the pistons move inwardly, the inner pistons 6 are received within the intermediate cylinder 2, and when both pistons 6 are at the limit of their inward movement, as hereinafter explained, they are spaced slightly apart to permit fluid pressure to act against the said pistons 6, which are operated on by constant pressure but, owing to the difference in the areas of the inner and outer pistons, there will be a superior force urging the pistons inwardly when fluid pressure is admitted to the outer ends of the end cylinders 3.

The passages 10 are controlled by a rotary valve 12 operating within a cylindrical casing 13 and preferably consisting of a cylindrical shell open at the rear end and provided at the front end with a spider 14 for connecting it with a valve stem 15, the spider forming substantially an open end so that the pressure on the two ends of the valve will be substantially the same to form practically a balance valve so that there will be no resistance to the longitudinal movement of the valve which is adapted to be shifted longitudinally as hereinafter explained to carry relatively large ports 16 into register with the inner ends of the passages 10 for connecting the said passages 10 with the interior of the valve to admit fluid pressure to the outer ends of both of the cylinders 3 for moving the piston inwardly simultaneously. The valve casing, which is preferably formed integral with the base, is provided at the rear end with a head or cap 17 having a threaded connection with the cylindrical valve casing and provided with a threaded opening 18 for connection with a suitable fluid pressure supply which may be an air compressor, storage tank, steam supply, fluid pressure pump for forcing oil or water through the stabilizer, or any other suitable means. By this construction, fluid pressure is admitted to the interior of the rotary valve and a constant pressure is maintained in the intermediate cylinder 2 by means of ports 19 and 20, the port 20 being formed in the bottom of the intermediate cylinder and the ports 19 in the top of the rotary valve, as clearly shown in Figs. 2 and 3. The port 19 of the rotary valve is of sufficient size to maintain a communication between the port 20 and the interior of the rotary valve, and in all positions of the latter to maintain a constant pressure on the inner pistons and also to permit the fluid pressure of the intermediate cylinder to be forced back out of the same by the superior pressure of the end pistons.

The rotary valve is provided at opposite sides with grooves or passages 21 preferably formed by indenting the side walls and adapted to connect the passages 10 with transverse passages 22 which are connected with the atmosphere by means of an opening 23. When the rotary valve is in its normal position, the passages 10 communicate with the atmosphere through the passages 21 and 22 and the opening 23. The rotary valve is also provided at opposite sides with feed ports 24 located below and spaced from the passages or grooves 21 and adapted, when the rotary valve is partially rotated, to connect one or the other of the passages 10 with the interior of the rotary valve and the fluid pressure supply for admitting fluid pressure to one of the end cylinders to move the end pistons thereof inwardly. The grooves or passages 21 are of sufficient width to allow either of the feed ports 24 to be carried into register with the corresponding passage 10 without disconnecting the other passage 10 from the coacting passage 21. The increased width of the grooves or passages 21 normally lies above the inner ends of the passages 10 so that the upward movement of one side of the rotary valve to carry the feed port to the passage 10 will result in a downward movement of the opposite side of the rotary valve and retain the passage or groove 21 in register with the adjacent passage 10.

The rotary valve is automatically operated by the lateral tilting of an aeroplane through the action of a pendulum 25 consisting of a wire equipped at the lower end with a weight 26 and having a head 27 at the upper end. The head 27 is provided with an opening 28 for the passage of the valve stem 15 and it has a recess 29 centrally of the top to receive a latch 30 of an operating lever 32 keyed at 33 to the valve stem 15 and having a latch lever 34 mounted on it and connected with the latch 30 for controlling the same to engage it with and disengage it from the head 27 of the pendulum. When the latch 30 is disengaged from the head of the pendulum, the valve is adapted to be rotated by the lever 32 independently of the said pendulum. The latch 30 is provided with a loop 35 which slidably connects the latch with the lever 32 but any other suitable means may of course be employed for mounting the latch or dog 30.

The outer end of the valve casing is provided with a packing gland 36 and the valve stem extends through a bracket 37 preferably in the form of a yoke and connected at its ends with the base. The bracket is provided at one side with spaced ears 38 between which is pivoted one end of a lever 39 which is connected intermediate of its ends with the outer end of the stem 15 of the rotary valve to enable the rotary valve to be moved inwardly to carry the ports or openings 16 simultaneously into register with the passages 10 to produce an inward movement of both of the end pistons and intermediate pistons. The lever 39 is provided between its ends with a slot 40 which receives a reduced portion 41 of the stem. The stem 15 is provided with a head or cap 42 which is spaced from the shoulder formed by the reduction 41 to provide a groove for the lever 39. The cap or head 42 may be secured to the end of the stem in any desired manner and it will enable the parts to be readily assembled. Any other suitable means may be employed for connecting the horizontal operating lever 39 with the stem and the connection between the stem and the lever will permit free rotary movement of the valve and the stem. The lever 39 may be equipped with suitable latch mechanism for enabling it to be secured in either of its positions for preventing accidental longitudinal movement of the rotary valve.

The base is provided at its ends with horizontally projecting supporting arms 43 to which are fulcrumed levers 44 pivoted to the arms by pins or bolts 45. The levers are of slight bell-crank formation, the upper and lower arms being arranged at an obtuse angle to each other, and the upper arms are connected with the outer ends of piston rods 46, whereby the levers will be actuated by the piston. The cylinder heads are provided with packing glands 47 and the outer ends of the piston rods are preferably bifurcated, as shown, to embrace the levers which are provided with slots 48 to receive pivots 49 of the piston rods to permit the necessary play of the parts incident to the oscillation of the levers.

In Figs. 4 to 6 of the drawings is illustrated another form of the invention in which the rotary valve 50 is indirectly operated by a pendulum 51 hung from a horizontal top shaft or pivot 52 which is journaled in a suitable bearing 53 at the center of the top of the intermediate cylinder 2 and which carries a depending sector 54. The depending sector 54, which is provided with teeth at its lower arcuate edge, meshes with teeth of a wheel or head 55 loosely mounted on the stem 56 of the valve 50 and provided at the bottom with a notch 57 adapted to be engaged by a latch 58 of an operating lever 59 keyed at 60 to the stem of the rotary valve and equipped with a latch lever 61 for operating the latch 58. The latch is adapted to engage the toothed wheel or gear element 55 for locking the same to the valve stem and the pendulum will then be connected with the rotary valve 50 and will produce an operation of the same but in a reverse direction from that of the form of the invention illustrated in Figs. 1 to 3 inclusive. Also the difference in the length of the diameters of the gear elements of the connection between the top shaft or pivot and the valve stem will produce a greater movement in the valve than occurs in the pendulum so that the desired flow of the rotary valve may be readily obtained and an exceedingly sensitive stabilizer produced. The reversal of the movement of the rotary valve 50 necessitates a slight change in the arrangement of the feed ports 61 which are located above the passages 62 and the latter have their excess of width below the passages 10 instead of above the same as in the form of the invention having the direct connection between the valve and the pendulum. The other parts of the stabilizer illustrated in Figs. 4 to 6 inclusive are substantially the same as the corresponding parts of the first form of the invention and the stabilizer is operated in the same manner in shifting the rotary valve longitudinally to produce an inward movement of the pistons.

The levers 44 are connected by wires or other suitable flexible connections 63 and 64 with arms 65 and 66 of auxiliary planes or ailerons 67 which may be of any desired construction and which are preferably mounted on transverse pivots, being hinged at their front ends and adapted to be swung downwardly in the automatic operation of the device so that when an aeroplane tilts laterally, the auxiliary plane at the lower side of the machine will be swung downwardly and the air acting upon the same will tend to lift and restore the equilibrium of the aeroplane. The flexible connections, which are shown in the diagrammatic views, Figs. 7 to 9 inclusive, are arranged on suitable guide pulleys 67 and 68 so that the proper pull will be imparted to the arms of the hinged auxiliary planes. Any other suitable means may of course be employed for transmitting motion from the lever to the planes. In Fig. 7 of the drawings, the machine is shown in a horizontal position with the auxiliary planes horizontal and the pistons are in their normal position at the outer ends of the end cylinders and at the ends of the intermediate cylinder. In Fig. 8 the machine is shown tilted to the left which will cause an inward movement of the left hand piston and a corresponding downward swinging of the left hand auxiliary plane 67. In Figs. 7 to 9 inclusive the planes 67 are shown in side view, while the stabilizer is shown in front elevation, parts being omitted for simplicity. In Fig. 9 of the drawings, both of the auxiliary planes are shown swung downwardly for the purpose of retarding the forward passage of the aeroplane. This will enable the auxiliary planes to coöperate with the tail of the machine and facilitate a gentle landing of the aeroplane. The simultaneous operation of the auxiliary planes may of course be employed wherever it is desirable to retard to a greater or less extent the forward movement of the machine.

The movement of the planes will be gradual and may be controlled by varying the size of the vent openings 11 and also the size of the ports or openings connecting the intermediate cylinder with the interior of the rotary valve. The pistons will thus be cushioned in their inward movement and the exhausting of the compressed air from the end cylinders will cushion the pistons in their outward movement. The perfect control of the speed of the pistons may be obtained in this manner and if desired, regulating means such as a cock or valve may be employed for adjustably controlling the escape of the air at the vent openings 11. The pendulum maintains a perpendicular position or substantially a perpendicular position and the lateral tilting of the machine carries with it the stabilizer and produces the relative rotary movement of the valves. While the stabilizer is shown applied to auxiliary planes, it may of course be employed for controlling the tail of a machine automatically and will maintain the machine in longitudinal equilibrium. Also any suitable means may be employed for locking the pendulum in a relatively fixed position when it is desired to operate the stabilizer manually. The independent control of the planes at opposite sides of the aeroplane will produce an exceedingly sensitive stabilizer and the relatively slow movement of the pistons and the gradual downward swinging of the auxiliary planes will produce an automatic stabilizing or balacing device which will gradually restore the aeroplane to equilibrium and prevent sudden lateral jerky movements. Also any suitable means may be employed for enabling the operating lever to be controlled by foot or hand.

What is claimed is:

1. A stabilizer of the class described including intermediate and end cylinders, inner and outer pistons operating in the cylinders, the outer piston being of greater area than the inner piston, means for maintaining a constant pressure against the inner piston, a rotary valve for controlling the feed and exhaust of fluid pressure to the outer pistons, and a pendulum connected with the rotary valve for producing relative movement of the same.

2. A stabilizer of the class described including intermediate and end cylinders, inner and outer pistons operating in the cylinders, the outer piston being of greater area than the inner piston, means for maintaining a constant pressure against the inner piston, a rotary valve for controlling the feed and exhaust of fluid pressure to the outer pistons, a pendulum connected with the rotary valve for producing relative movement of the same, piston rods connected with the outer piston, levers fulcrumed intermediate of their ends and connected to and actuated by the piston rods, and means for connecting the levers with the movable planes of an aeroplane.

3. A stabilizer of the class described including intermediate and end cylinders, inner and outer pistons operating in the cylinders, the inner pistons being of less diameter than the outer pistons and connected with and carried by the same, said inner pistons operating within the intermediate cylinder, means for maintaining a constant pressure in the intermediate cylinder, a pendulum, and means controlled by the pendulum for introducing fluid pressure into the end cylinders at the outer ends thereof.

4. A stabilizer of the class described including intermediate and end cylinders, inner and outer pistons operating in the cylinders, the inner pistons being of less diameter than the outer pistons and connected with and carried by the same, said inner pistons operating within the intermediate cylinders, means for maintaining a constant pressure in the intermediate cylinder, a pendulum, and means controlled by the pendulum for introducing fluid pressure into the end cylinders at the outer ends thereof, and vents located at the inner ends of the outer cylinders for controlling the speed of the inward movement of the pistons.

5. A stabilizer of the class described including intermediate and end cylinders connected together, the intermediate cylinder being of less diameter than the end cylinders, inner and outer pistons connected together, the inner pistons being of substantially the diameter of the intermediate cylinder and movable into and out of the same, a valve casing connected with the intermediate cylinder and with the outer ends of the end cylinders, a rotary valve mounted within the valve casing and provided with means for producing a constant pressure within the intermediate cylinder and for normally connecting the end cylinders with the atmosphere, said valve being also provided with means for supplying pressure to the end cylinders when it is partially rotated, and a pendulum connected with the rotary valve for producing relative rotary movement of the same through the tilting of an aeroplane.

6. A stabilizer of the class described including intermediate and end cylinders, a valve casing connected with the intermediate and end cylinders, inner and outer pistons operating within the said cylinders, a rotary valve mounted within the valve casing and provided with means for maintaining a constant pressure within the intermediate cylinder and for normally connecting the end cylinders with an exhaust, said rotary valve being provided at opposite sides with feed ports arranged to be carried into communication with the end cylinders by a partial rotary movement of the valve to produce an independent operation of the pistons, and a pendulum connected with the valve for producing relative movement of the same when the stabilizer is tilted.

7. A stabilizer of the class described including intermediate and end cylinders, a valve casing connected with the intermediate and end cylinders, a rotary valve mounted within the valve casing and provided with means for maintaining a constant pressure within the intermediate cylinder and for normally connecting the end cylinders with an exhaust, said rotary valve being provided at opposite sides with feed ports arranged to be carried into communication with the end cylinders by a partial rotary movement of the valve to produce an independent operation of the pistons, said valve being also provided with feed ports adapted to be carried by a sliding movement of the valve into communication with the end cylinders to provide a simultaneous operation of the pistons, a pendulum, means for connecting the pendulum with the valve for producing an automatic operation of the same and for disconnecting the pendulum from the valve to permit a manual operation of the latter, and means for actuating the valve manually.

8. A stabilizer of the class described including a base, intermediate and end cylinders supported by the base, the intermediate cylinder being of less diameter than the end cylinders, and said base having a valve casing and provided with passages connecting the valve casing with the end cylinders, said base being also provided with an exhaust passage and having an opening or port communicating with the intermediate cylinder, a rotary valve consisting of a shell and provided with a port or opening in constant communication with the intermediate cylinder to produce a continuous pressure within the same, said valve having exterior passages connecting the passages of the end cylinders with the exhaust passage when in its normal position, said valve being also provided with feed ports spaced from the exterior passages and arranged to be carried into register with the passages of the end cylinders by a partial rotary movement of the valve, and a pendulum for controlling the valve.

9. A stabilizer of the class described including a base, intermediate and end cylinders supported by the base, the intermediate cylinder being of less diameter than the end cylinders, said base having a valve casing and provided with passages connecting the valve casing with the end cylinders, said base being also provided with an exhaust passage and having an opening or port communicating with the intermediate cylinder, a rotary valve consisting of a shell and with the intermediate cylinder to produce a continuous pressure within the same, said valve having exterior passages connecting the passages of the end cylinders with the exhaust passage when in its normal position, said valve being also provided with feed ports spaced from the exterior passages and arranged to be carried into register with the passages of the end cylinders by a partial rotary movement of the valve, said feed ports being located at one side of the exterior ports or passages and the latter being of sufficient width to permit one of the feed ports to be carried into communication with one of the end cylinders without disturbing the communication of the other end cylinder with the exhaust passage.

10. A stabilizer of the class described including intermediate and end cylinders, inner and outer pistons, the inner pistons being of less diameter than the outer pistons and movable inwardly and outwardly in the intermediate cylinder, a rotary valve provided with means for maintaining a constant pressure within the intermediate cylinder and for introducing fluid pressure into the end cylinder and exhausting it therefrom, a pendulum, a manually operable means connected with the valve and provided with locking means for connecting the pendulum with the valve and for disconnecting it therefrom.

11. A stabilizer of the class described including intermediate and end cylinders, the intermediate cylinder being of less diameter than the end cylinders, inner and outer pistons operating in the cylinders and connected with each other, a rotary valve provided with means for maintaining a constant pressure within the intermediate cylinder and having means for introducing pressure into the end cylinders and exhausting it therefrom, said means being located at spaced points for producing an independent operation of the pistons, said valve being also provided with means adapted to be brought into communication with the end cylinders by a reciprocation of the valve for producing a simultaneous operation of the pistons, a pendulum, a manually operable lever connected with the valve and having means for connecting the pendulum with the same and for disconnecting it therefrom, and a manually operable lever connected with the valve for reciprocating the latter when the pendulum is disconnected from the said valve.

12. A stabilizer of the class described including intermediate and end cylinders, the intermediate cylinder being of less diameter than the end cylinders, inner and outer pistons operating in the cylinders, a rotary valve having means for producing a constant pressure in the intermediate cylinder and provided also with means for introducing fluid pressure into and exhausting it from the end cylinders to produce an independent operation of the pistons, said valve being also reciprocable and having means operable by such reciprocation to produce a simultaneous operation of the pistons, a valve stem connected with the valve, a manually operable lever connected with the valve stem for reciprocating the valve, a pendulum, and means for connecting the pendulum with and disconnecting it from the valve stem.

13. A stabilizer of the class described including intermediate and end cylinders, the intermediate cylinder being of less diameter than the end cylinders, inner and outer pistons operating in the cylinders, a rotary valve having means for producing a constant pressure in the intermediate cylinder and provided also with means for introducing fluid pressure into and exhausting it from the end cylinders to produce an independent operation of the pistons, said valve being also reciprocable and having means operable by such reciprocation to produce a simultaneous operation of the pistons, a valve stem connected with the valve, a manually operable lever connected with the valve stem for reciprocating the valve, a pendulum, a manually operable lever keyed to the valve stem and provided with a latch for connecting the pendulum with and disconnecting it from the valve stem.

14. A stabilizer of the class described including intermediate and end cylinders, the intermediate cylinder being of less diameter than the end cylinders, inner and outer pistons operating in the cylinders, a rotary valve having means for producing a constant pressure in the intermediate cylinder and provided also with means for introducing fluid pressure into and exhausting it from the end cylinders to produce an independent operation of the pistons, said valve being also reciprocable and having means operable by such reciprocation to produce a simultaneous operation of the pistons, a valve stem connected with the valve, a manually operable lever connected with the valve stem for reciprocating the valve, a shaft, a pendulum hung from the shaft, gear elements meshing with each other and mounted respectively on the shaft and on the valve stem, means for manually operating the valve stem, and means for connecting and disconnecting the gear element of the valve stem to and from the same.

15. A stabilizer of the class described including intermediate and end cylinders, the intermediate cylinder being of less diameter than the end cylinders, inner and outer pistons operating in the cylinders, a rotary valve having means for producing a constant pressure in the intermediate cylinder and provided also with means for introducing fluid pressure into and exhausting it from the end cylinders to produce an independent operation of the pistons, said valve being also reciprocable and having means operable by such reciprocation to produce a simultaneous operation of the pistons, a valve stem connected with the valve, a manually operable lever connected with the valve stem for reciprocating the valve, a shaft, a pendulum hung from the shaft, gear elements meshing with each other and mounted respectively on the shaft and on the valve stem, a lever keyed to the valve stem, and latch mechanism mounted on the lever and arranged to engage the gear element of the valve stem for connecting it with the stem and for disconnecting it therefrom.

16. A stabilizer of the class described including intermediate and end cylinders, the intermediate cylinder being of less diameter than the end cylinders, inner and outer pistons operating in the cylinders, a rotary valve having means for producing a constant pressure in the intermediate cylinder and provided also with means for introducing fluid pressure into and exhausting it from the end cylinders to produce an independent operation of the pistons, said valve being also reciprocable and having means operable by such reciprocation to produce a simultaneous operation of the pistons, a valve stem connected with the valve, a manually operable lever connected with the valve stem for reciprocating the valve, a shaft extending across the top of the intermediate cylinder, a pendulum hung from the rear end of the shaft, a toothed sector connected with the front end of the shaft, a toothed head loosely mounted on the valve stem and meshing with the sector, a manually operable lever keyed to the valve stem, and latch mechanism carried by the manually operable lever for engaging the said head.

In testimony whereof I affix my signature in presence of two witnesses.

GEORGE A. FOWLER, Jr.

Witnesses:
R. M. SMITH,
GEORGE A. FOWLER, Sr.